United States Patent
Hashimoto

(10) Patent No.: US 8,928,845 B2
(45) Date of Patent: Jan. 6, 2015

(54) LIQUID CRYSTAL OPTICAL ELEMENT, OPTICAL DEVICE, AND APERTURE CONTROL METHOD

(75) Inventor: Nobuyuki Hashimoto, Iruma (JP)

(73) Assignee: Citizen Holdings Co., Ltd., Tokyo (JP)

( * ) Notice: Subject to any disclaimer, the term of this patent is extended or adjusted under 35 U.S.C. 154(b) by 548 days.

(21) Appl. No.: 11/408,187

(22) Filed: Apr. 21, 2006

(65) Prior Publication Data

US 2006/0239170 A1    Oct. 26, 2006

(30) Foreign Application Priority Data

Apr. 22, 2005  (JP) ................................ 2005-125239

(51) Int. Cl.
| | |
|---|---|
| G02F 1/1343 | (2006.01) |
| G11B 7/139 | (2012.01) |
| G11B 7/1392 | (2012.01) |
| G11B 7/1369 | (2012.01) |
| G02F 1/29 | (2006.01) |
| G11B 7/00 | (2006.01) |

(52) U.S. Cl.
CPC ............ *G11B 7/13927* (2013.01); *G11B 7/139* (2013.01); *G02F 1/29* (2013.01); *G02F 1/134309* (2013.01); *G11B 2007/0006* (2013.01); *G11B 7/1369* (2013.01)
USPC ........... 349/141; 349/139; 349/143; 349/147; 349/149

(58) Field of Classification Search
CPC  G11B 7/137; G11B 7/0045; G02F 2001/294; G02B 3/14; G02B 26/06
USPC ............ 349/141, 84, 139, 143, 147, 149, 151
See application file for complete search history.

(56) References Cited

U.S. PATENT DOCUMENTS

| | | | | |
|---|---|---|---|---|
| 4,572,616 | A | * | 2/1986 | Kowel et al. ................... 349/200 |
| 5,281,797 | A | * | 1/1994 | Tatsuno et al. ............. 250/201.5 |
| 5,734,637 | A | | 3/1998 | Ootaki et al. |
| 6,078,554 | A | * | 6/2000 | Ootaki et al. ............ 369/112.02 |
| 6,625,102 | B1 | * | 9/2003 | Hashimoto .............. 369/112.16 |

(Continued)

FOREIGN PATENT DOCUMENTS

| | | |
|---|---|---|
| JP | 06-124477 | 5/1994 |
| JP | 09-106566 | 4/1997 |

(Continued)

OTHER PUBLICATIONS

Notice of Reasons for Rejection for co-pending Japanese Patent Application No. 2006-117691, mailed Sep. 13, 2011.

*Primary Examiner* — Jennifer Doan
(74) *Attorney, Agent, or Firm* — Finnegan, Henderson, Farabow, Garrett & Dunner, L.L.P.

(57) ABSTRACT

The present invention is directed to the provision of a liquid crystal optical element that can accurately change the numerical aperture of an objective lens regardless of variations in temperature or wavelength. The liquid crystal optical element comprises a first substrate, a second substrate, a liquid crystal provided between the first and second substrates, an electrode pattern formed on one of the first and second substrates and having an aperture control region, and an opposite electrode formed on the other one of the first and second substrates, the opposite electrode being opposed to the electrode pattern for applying a voltage therebetween, wherein a plurality of electrodes, for changing refractive index and thereby causing the incident light passing through the aperture control region to diverge, are formed in the aperture control region.

11 Claims, 10 Drawing Sheets

(56) References Cited

U.S. PATENT DOCUMENTS

| | | |
|---|---|---|
| 6,781,771 B2 | 8/2004 | Kitahara |
| 7,312,917 B2 * | 12/2007 | Jacob .......................... 359/319 |
| 7,428,207 B2 | 9/2008 | Sato et al. |
| 2002/0191502 A1 * | 12/2002 | Hirai ......................... 369/44.24 |
| 2003/0035356 A1 * | 2/2003 | Stallinga et al. ........... 369/53.19 |
| 2003/0053020 A1 * | 3/2003 | Okada et al. ................. 349/139 |
| 2003/0227859 A1 * | 12/2003 | Hirai ........................ 369/112.12 |
| 2005/0270955 A1 * | 12/2005 | Hirai ........................ 369/112.01 |

FOREIGN PATENT DOCUMENTS

| | | |
|---|---|---|
| JP | 3036314 | 4/1997 |
| JP | 2003-344759 | 12/2003 |
| JP | 2004-178773 | 6/2004 |
| JP | 2005-71424 | 3/2005 |

\* cited by examiner

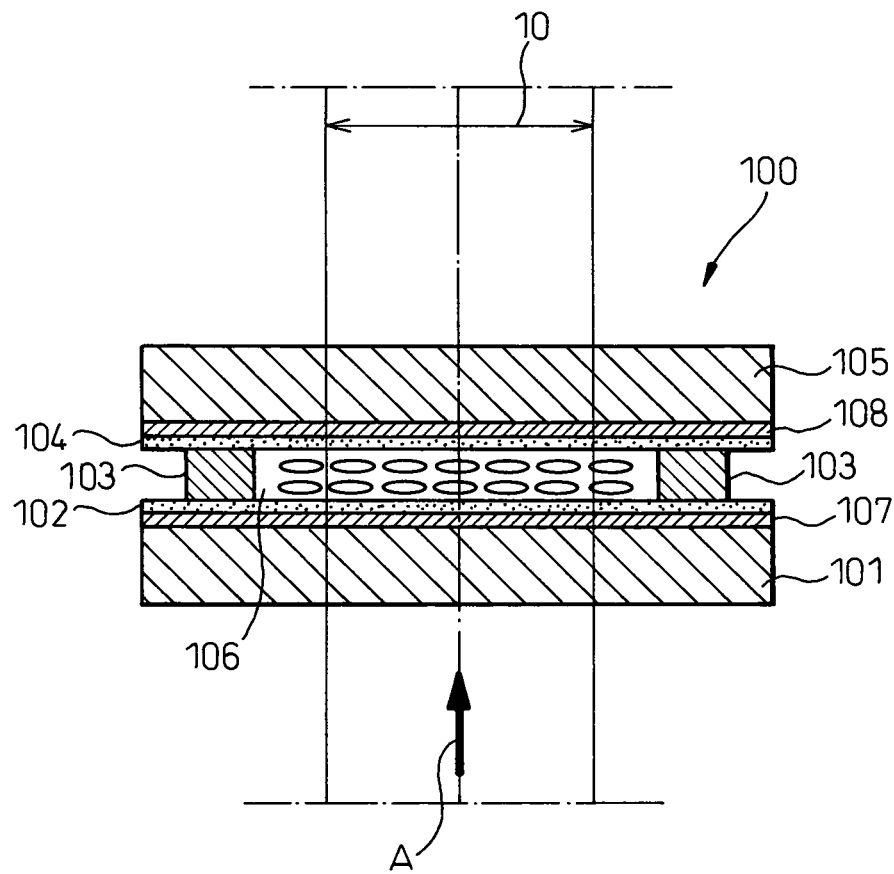

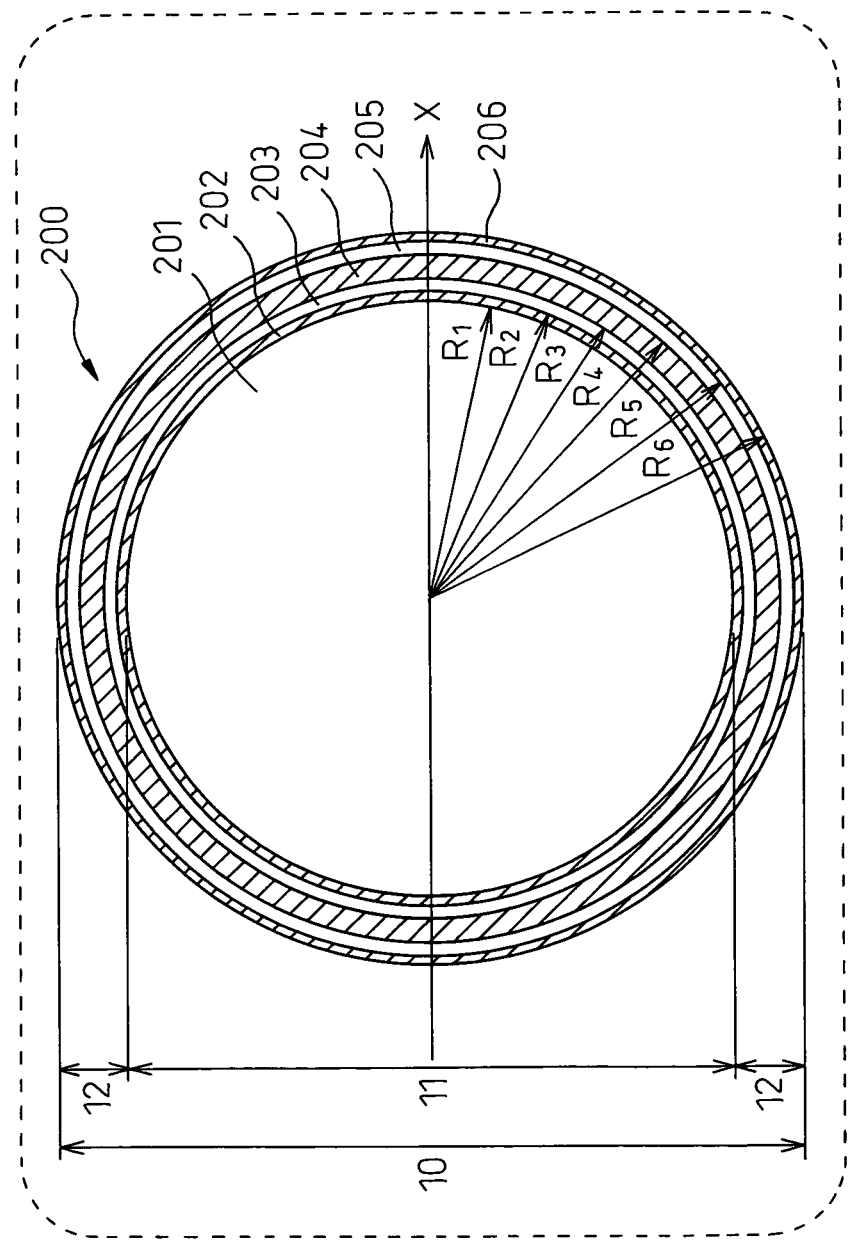

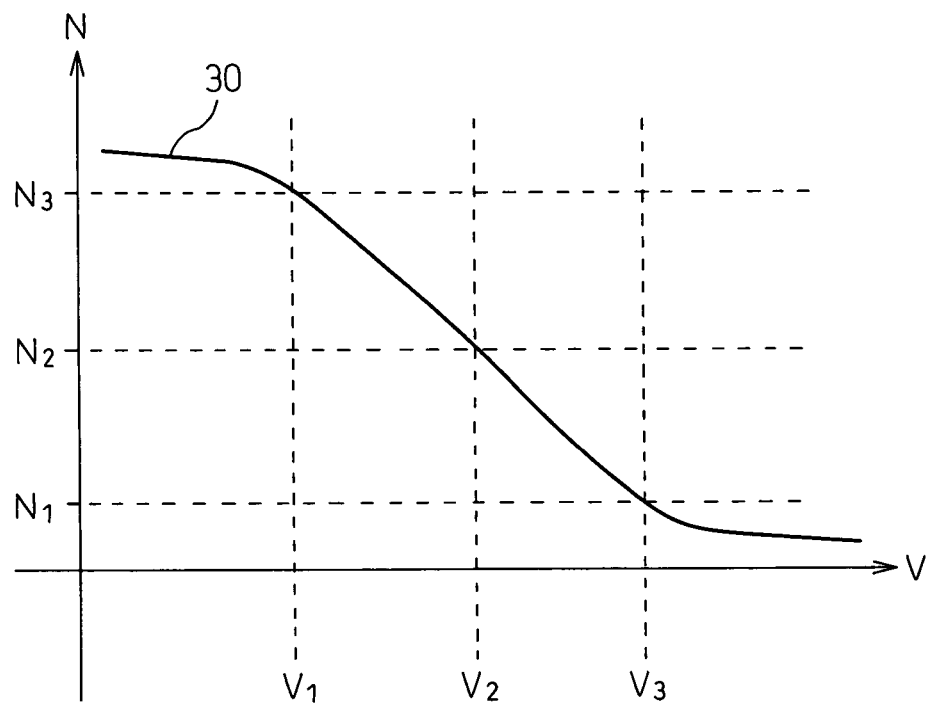

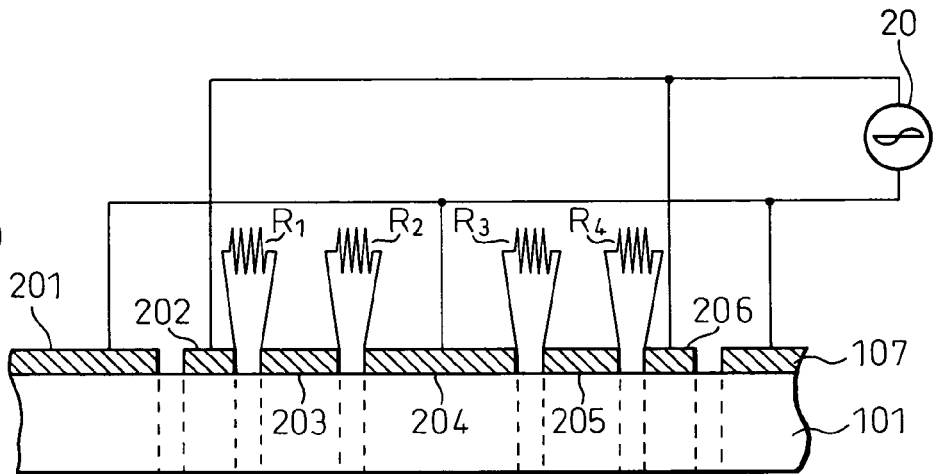
Fig.4(a)
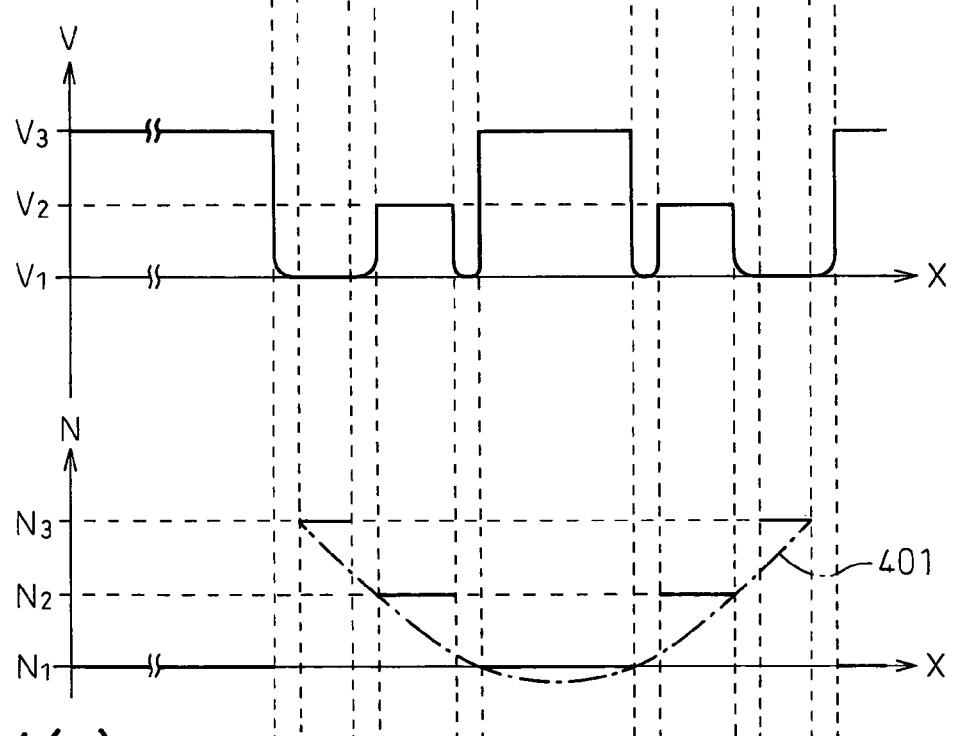
Fig.4(b)
Fig.4(c)

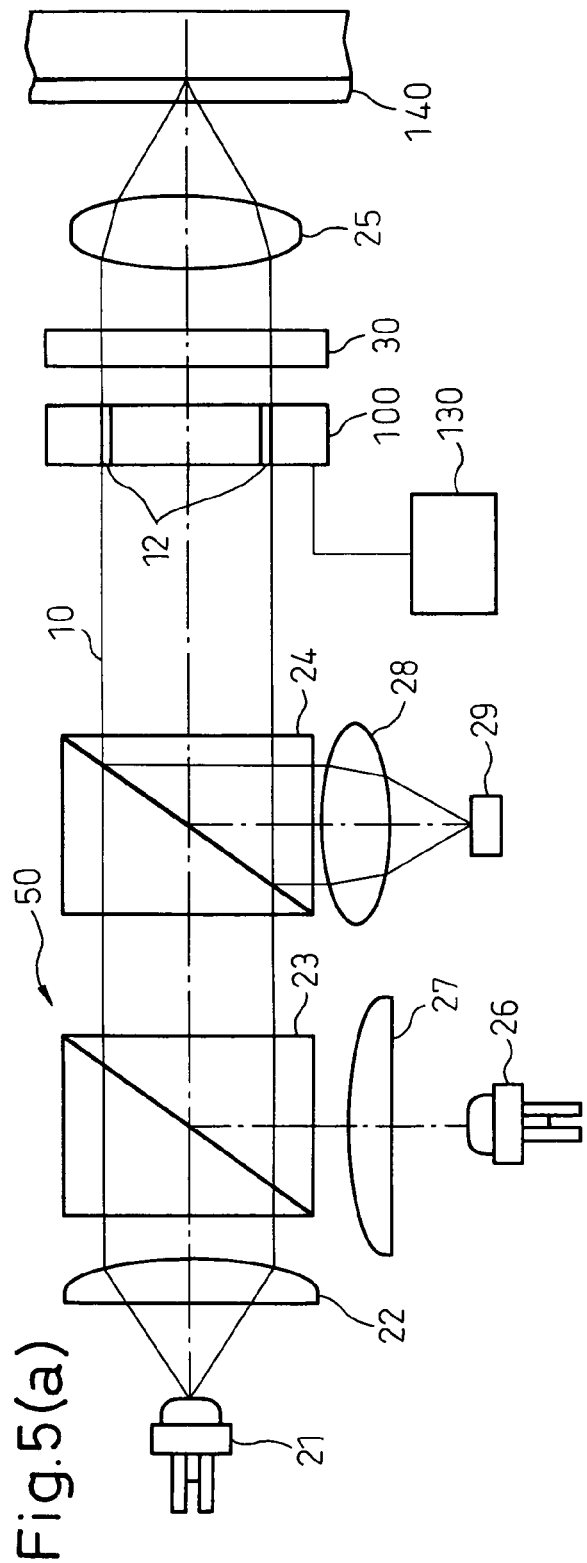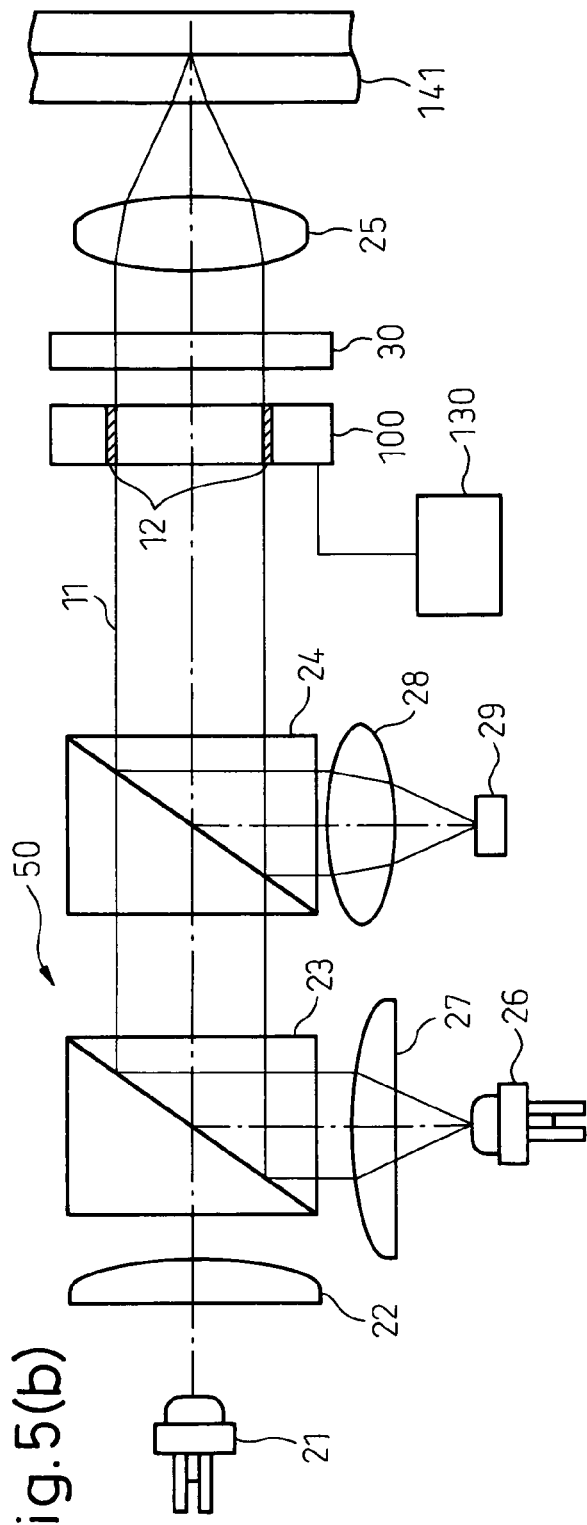

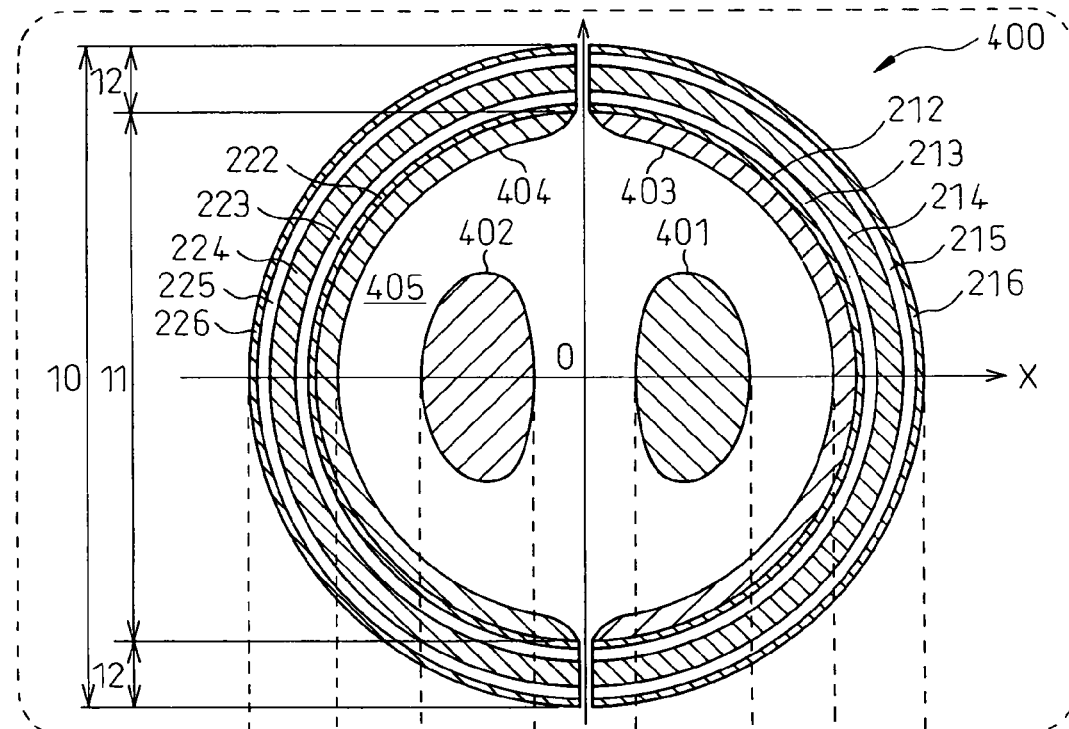
Fig.9(a)
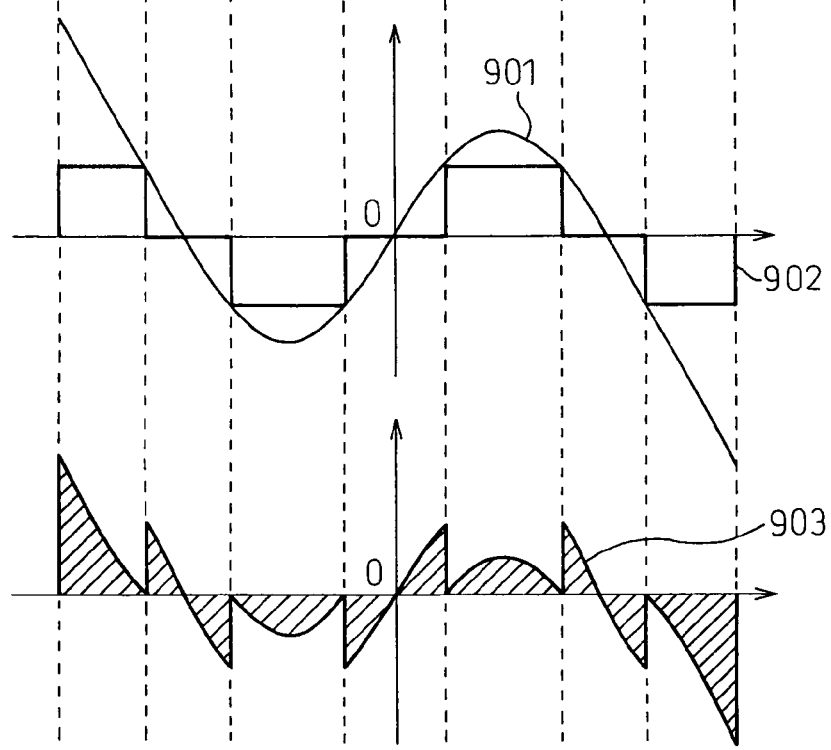
Fig.9(b)
Fig.9(c)

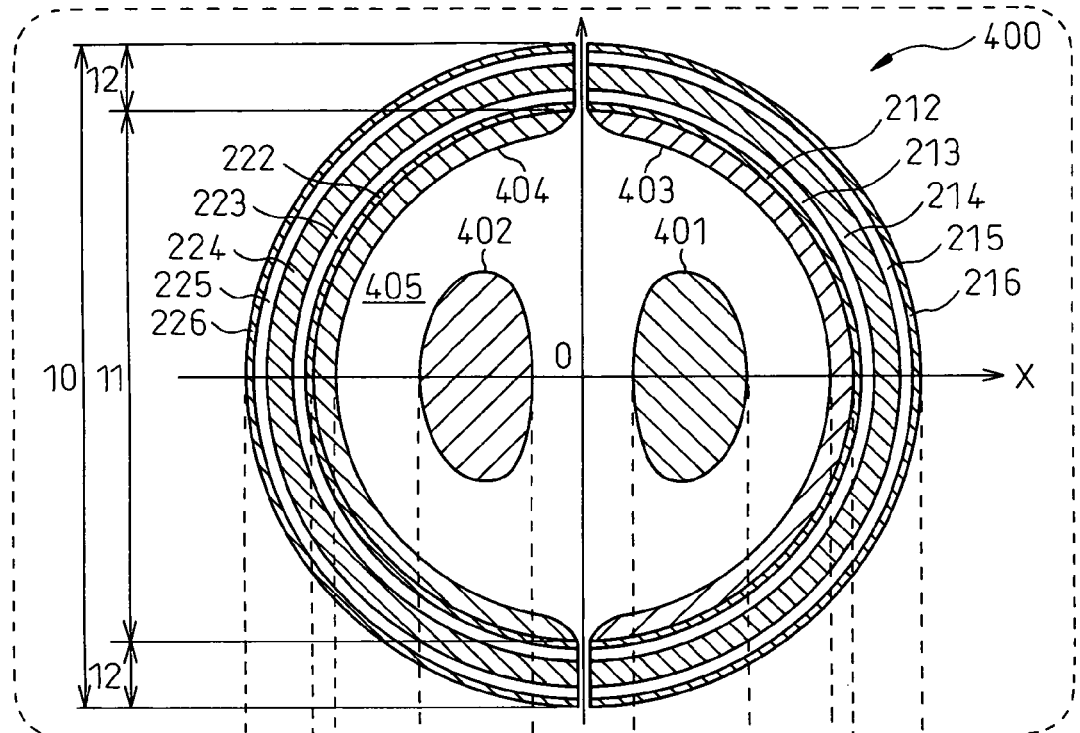
Fig.10(a)
Fig.10(b)
Fig.10(c)
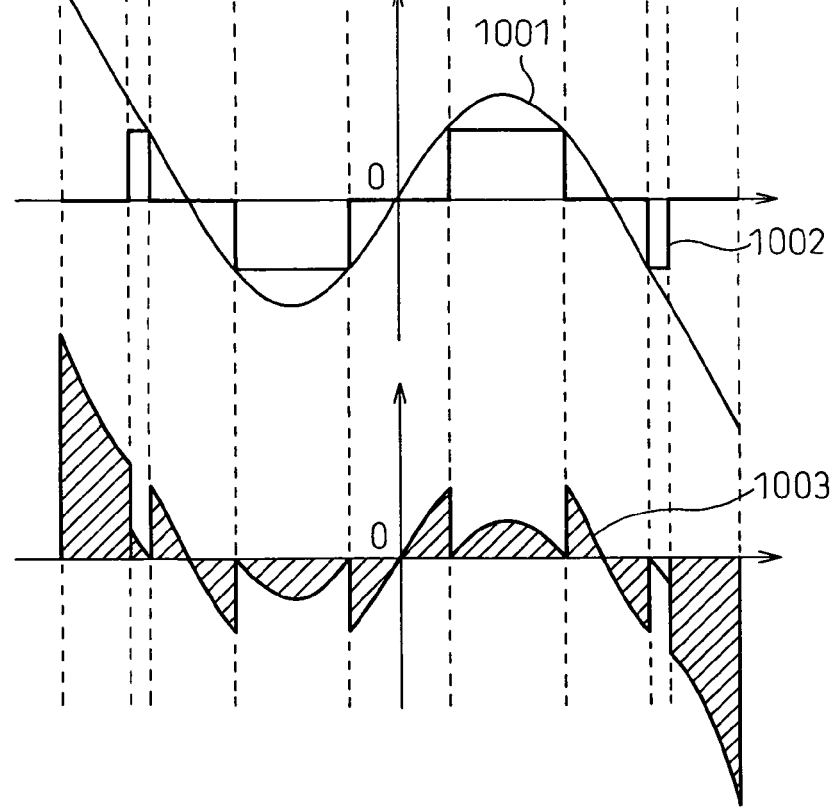

LIQUID CRYSTAL OPTICAL ELEMENT, OPTICAL DEVICE, AND APERTURE CONTROL METHOD

This application is a new U.S. patent application that claims benefit from JP 2005-125239 filed on Apr. 22, 2005. The entire content of JP 2005-125239 is herein incorporated by reference.

TECHNICAL FIELD

The present invention relates to a liquid crystal optical element for controlling the aperture of a light beam, an optical device using such a liquid crystal optical element, and an aperture control method for use in such an optical device.

BACKGROUND OF THE INVENTION

An optical pickup device that is designed to be able to read optical recording media of different numerical aperture specifications, such as CD and DVD, by adding a ring belt to an objective lens and thereby apparently causing the light falling on the outer edges to vanish for a given wavelength by the interference action of the ring (Patent Document 1), is known. However, since it is not easy to form a ring belt for causing interference to a particular wavelength on the objective lens, this prior art design has had the problem of increased cost and reduced yield. A further problem has been that it is difficult to provide for a plurality of light wavelengths because the wavelength for which the interference action can be effectively caused is limited to a particular wavelength.

It is also known to provide a device which, using a single pickup, can detect information pits not only on a low-density disk but also on a high-density disk by selectively changing the polarization direction of light passing through a designated region of a liquid crystal filter and by eliminating, using a polarization beam splitter, the light whose polarization direction has been changed (or not changed) (Patent Document 2). To eliminate the unwanted light, the polarization beam splitter must invariably be inserted in the light path, but the problem has been that, because of the provision of the polarization beam splitter, the amount of light decreases or the freedom of design of the light path is limited. There has also been the problem that the polarization beam splitter is expensive, correspondingly increasing the cost of the device.

There is known a device in which a voltage is applied to a designated region of a liquid crystal panel, thereby causing the designated region to act as a λ/4 plate and allowing only the light passed through that region to be directed to a light detector by a polarization beam splitter (Patent Document 3). With this device, the diameter of the light beam that passes through the liquid crystal panel can be varied by selectively varying the region to be caused to act as the λ/4 plate. This is equivalent to varying the numerical aperture of the objective lens and, thus, this single device can be used for both a CD and a DVD. However, since the refractive index of the liquid crystal changes with temperature, there has been the problem that a strict temperature control mechanism becomes necessary in order to accurately operate the liquid crystal panel as a λ/4 panel and, as a result, the complexity of the structure increases correspondingly. Furthermore, as the refractive index of the liquid crystal changes with wavelength, there has also been the problem that light of a plurality of wavelengths cannot be used. A further problem has been that light that has not been accurately rotated through λ/4 is directed back to the light detector as noise.

There is also known a device in which wavelength-selective diffraction gratings arranged at equally spaced intervals are inserted in a light path in such manner that light of a first wavelength is allowed to pass freely through the wavelength-selective diffraction gratings, while light of a second wavelength is diffracted to outside the optical axis by the wavelength-selective diffraction gratings (Patent Document 4). With this device, by using the first wavelength for a DVD and the second wavelength for a CD, both CD and DVD readout can be accomplished using a single objective lens. However, as the wavelength-selective diffraction gratings arranged at precisely equally spaced intervals are not easy to fabricate because of their geometry, this prior art device has had the problem of increased cost and reduced yield. Furthermore, the wavelength that can be effectively diffracted is limited to a particular wavelength, but this wavelength varies with the temperature of the light source; therefore, there has been the problem that a strict temperature control mechanism becomes necessary in order to effectively achieve diffraction and, as a result, the complexity of the structure is correspondingly increased.

Patent Document 1: JP-A-2003-344759 (FIG. 1)
Patent Document 2: JP-B-3048768 (FIG. 1)
Patent Document 3: JP-B-3476989 (FIGS. 1 and 3)
Patent Document 4: JP-Y-3036314 (FIG. 3)

SUMMARY OF THE INVENTION

It is an object of the present invention to provide a liquid crystal optical element that can accurately change the numerical aperture of the objective lens regardless of variations in temperature or wavelength.

It is another object of the present invention to provide a liquid crystal optical element that can accurately change the numerical aperture of the objective lens by using a simple structure.

It is a further object of the present invention to provide a liquid crystal optical element that can accurately change the numerical aperture of the objective lens without causing interference, due to unwanted light, when the numerical aperture is limited.

A liquid crystal optical element according to the present invention comprises a first substrate, a second substrate, a liquid crystal provided between the first and second substrates, an electrode pattern formed on one of the first and second substrates and having an aperture control region, and a opposite electrode formed on the other one of the first and second substrates, the counter electrode being opposed to the electrode pattern for applying a voltage therebetween, wherein a plurality of electrodes for changing a refractive index, and thereby causing the incident light passing through the aperture control region to diverge, are formed in the aperture control region.

An optical device according to the present invention comprises a light source, a liquid crystal optical element which includes a first substrate, a second substrate, a liquid crystal provided between the first and second substrates, an electrode pattern formed on one of the first and second substrates and having an aperture control region, and a opposite electrode formed on the other one of the first and second substrates, the opposite electrode being opposed to the electrode pattern for applying a voltage therebetween, wherein a plurality of electrodes for changing refractive index and thereby causing incident light emitted from the light source and passing through the aperture control region to diverge are formed in the aperture control region, and an objective lens for focusing light passed through the liquid crystal optical element.

An aperture control method according to the present invention comprises the steps of turning on a first light source, generating a refractive index profile by the plurality of electrodes formed in the aperture control region, and thereby causing the incident light emitted from the first light source and passing through the aperture control region to diverge, allowing the light passed through other regions of the liquid crystal optical element than the aperture control region to be focused through the objective lens onto a first recording medium, turning on a second light source; and controlling the plurality of electrodes formed in the aperture control region so as not to generate the refractive index profile, and allowing the light passed through the aperture control region of the liquid crystal optical element and the light passed through the regions other than the aperture control region to be focused through the objective lens onto a second recording medium.

According to the present invention, the aperture control can be effectively performed by using the liquid crystal optical element but without using any movable parts.

Further, according to the present invention, spherical aberration correction or coma aberration correction can be performed in addition to the aperture control.

BRIEF DESCRIPTION OF THE DRAWINGS

FIG. 1 is a diagram showing one example of a cross-sectional view of a liquid crystal optical element according to the present invention.

FIG. 2 is a diagram showing one example of a transparent electrode pattern.

FIG. 3 is a diagram showing the relationship between applied voltage and refractive index for a liquid crystal.

FIG. 4($a$) is an enlarged view of a portion of the transparent electrode pattern shown in FIG. 2, FIG. 4($b$) is a diagram showing one example of a voltage profile applied to ring belts, and FIG. 4($c$) is a diagram showing one example of the refractive index profile of the ring belts.

FIG. 5($a$) is a diagram schematically showing the configuration of an optical device when a first light source is turned on, and FIG. 5($b$) is a diagram schematically showing the configuration of the optical device when a second light source is turned on.

FIG. 9($a$) is a diagram showing one example of a transparent electrode pattern used for aperture control and coma aberration correction, FIG. 9($b$) is a diagram showing one example of a voltage profile applied to the transparent electrode pattern shown in FIG. 9($a$), and FIG. 9($c$) is a diagram showing one example of a residual aberration resulting from FIG. 9($b$).

FIG. 10($a$) is a diagram showing one example of the transparent electrode pattern used for aperture control and coma aberration correction, FIG. 10($b$) is a diagram showing another example of the voltage profile applied to the transparent electrode pattern shown in FIG. 10($a$), and FIG. 10($c$) is a diagram showing one example of a residual aberration resulting from FIG. 10($b$).

DESCRIPTION OF THE PREFERRED EMBODIMENT

Figure 6A:
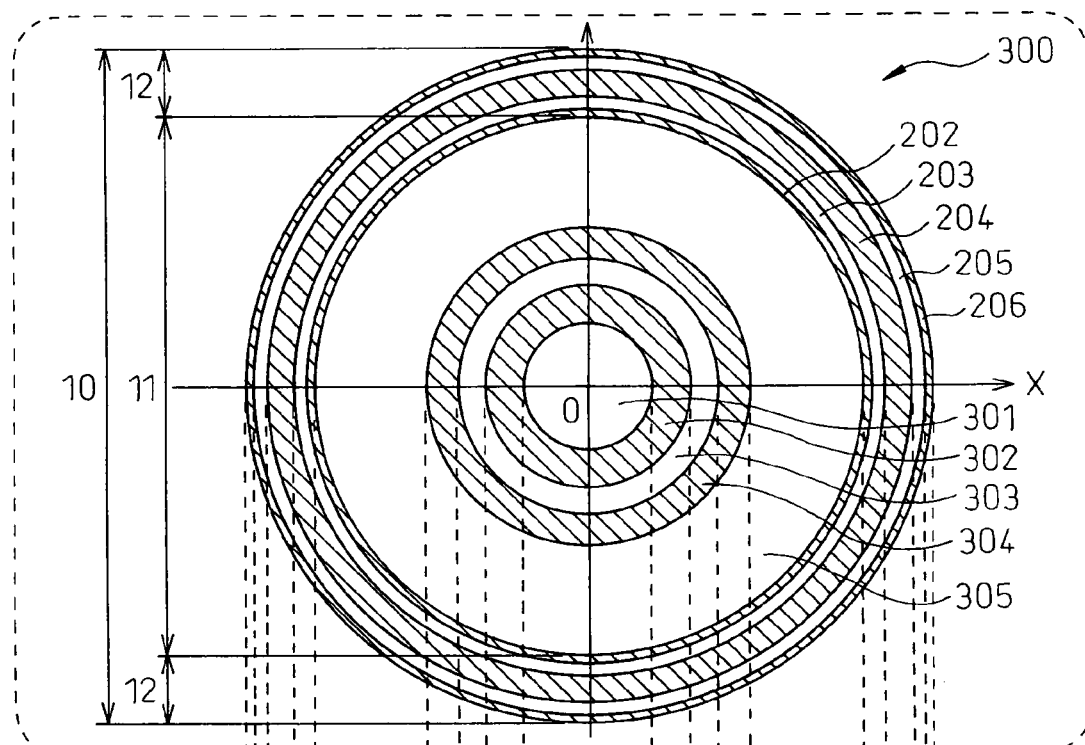
FIG. 6($a$) is a diagram showing one example of a transparent electrode pattern used for aperture control and spherical aberration correction, FIG. 6($b$) is a diagram showing one example of a voltage profile applied to the transparent electrode pattern shown in FIG. 6($a$), and FIG. 6($c$) is a diagram showing one example of a residual aberration resulting from FIG. 6($b$).

A liquid crystal optical element, an optical device, and an aperture control method according to the present invention will be described below with reference to the drawings. It should, however, be understood that the present invention is not limited to the embodiments shown in the drawings.

FIG. 1 is a diagram showing a cross-sectional view of the liquid crystal optical element 100 according to the present invention.

The direction shown by arrow A in the figure indicates the direction from which light is incident on the liquid crystal optical element 100. In FIG. 1, an alignment film 102 and a transparent electrode having a refractive index correcting transparent electrode pattern 200 to be described hereinafter are formed on a transparent substrate 101 on the light incident side. On the other hand, an alignment film 104 and a transparent counter electrode 108 are formed on a transparent substrate 105 on the opposite side. A liquid crystal 106, about 10 μm thick, is sandwiched between the two transparent substrates 101 and 105 and sealed by a sealing member 103. The thicknesses of the constituent elements shown in FIG. 1 are exaggerated for illustrative purposes, and the actual thickness ratio between the constituent elements is different from that shown here.

The two transparent substrates 101 and 105 are each formed from a glass material, and the sealing member 103 is formed from a resin. In the present embodiment, the liquid crystal 106 sandwiched between the two transparent substrates 101 and 105 is a homogeneously aligned liquid crystal, but instead, a vertically aligned liquid crystal may be used.

FIG. 2 is a diagram showing one example of the refractive index correcting transparent electrode pattern 200 of the liquid crystal optical element 100 shown in FIG. 1.

As shown in FIG. 2, the electrode pattern 200 comprises concentric ring belts 201 to 206 formed within a range of a first effective diameter 10, the ring belts being spaced apart by a small distance for insulation. Here, the diameter of the first ring belt 201 is the same as a second effective diameter 11, and the region between the first effective diameter 10 and the second effective diameter 11 is defined as an aperture control region 12. Five ring belts, i.e., the second to sixth ring belts 202 to 206, are formed in the aperture control region 12.

The radii of the ring belts 201 to 206 (each radius other than $R_6$ represents the distance from the common center to the midpoint of the gap between ring belts) are, for example, $R_1$=0.78, $R_2$=0.80, $R_3$=0.83, $R_4$=0.95, $R_5$=0.98, and $R_6$=1.00. These radii are expressed in numeric values relative to the outermost radius $R_6$ of the sixth ring belt 206=1.00.

FIG. 3 is diagram showing a graph 30 which depicts the relationship between applied voltage and effective refractive index for the liquid crystal 106 used in the present embodiment.

As shown in FIG. 3, the homogeneously aligned liquid crystal 106 exhibits a nonlinear characteristic such that the effective refractive index gradually decreases as the applied voltage increases. However, as there is a region where the effective refractive index changes substantially linearly between the applied voltage range of $V_1$ to $V_3$, the present embodiment uses this region as the region for controlling the refractive index.

FIG. 4 is a diagram showing the ring belts 201 to 206 and the relationship between applied voltage and refractive index profile.

FIG. 4(a) is an enlarged cross-sectional view of a portion of the transparent electrode pattern 200 formed on the transparent substrate 101. The ring belt to ring belt gap is set to 3 µm for all the ring belts (the gap shown is exaggerated for illustrative purposes). A resistor $R_1$ is interposed between the second ring belt 202 and the third ring belt 203, a resistor $R_2$ is interposed between the third ring belt 203 and the fourth ring belt 204, a resistor $R_3$ is interposed between the fourth ring belt 204 and the fifth ring belt 205, and a resistor $R_4$ is interposed between the fifth ring belt 205 and the sixth ring belt 206. An AC voltage from a power supply 20 is applied between the first ring belt 201 and the fourth ring belt 204 and also between the second ring belt 202 and the sixth ring belt 206.

FIG. 4(b) shows the RMS voltage relative to the reference voltage $V_1$ (the voltage applied between the second ring belt 202 and the sixth ring belt 206, which is assume to be 0[V] in the illustrated example). As shown in FIG. 4(b), the voltage $V_1$ is applied to the second and sixth ring belts 202 and 206, the voltage $V_2$ is applied to the third and fifth ring belts 203 and 205, and the voltage $V_3$ is applied to the first and fourth ring belts 201 and 204.

Generally, the liquid crystal used in the liquid crystal optical element responds to the RMS value of the applied voltage. Further, if a DC voltage component is applied to the liquid crystal for an extended period of time, troubles such as image sticking and decomposition occur in the liquid crystal. Accordingly, the liquid crystal is driven by applying an AC voltage across the transparent electrodes so that the DC voltage component will not be applied to the liquid crystal. Here, the reference voltage 0[V] for the liquid crystal optical element is actually the voltage applied across the liquid crystal layer, and the voltage value can be set suitably. Generally, the state in which the applied voltage is 0[V] is often used as the reference, but other suitable voltage (for example, 3[V]) may be used as the reference voltage.

FIG. 4(c) shows the refractive index N occurring in the liquid crystal 106 between each ring belt and the transparent opposite electrode 108. From the relationship between the refractive index and the applied voltage shown in FIG. 3, the refractive index $N_1$ (for example, 15) occurs in the first and fourth ring belts 201 and 204, the refractive index $N_2$ occurs in the third and fifth ring belts 203 and 205, and the refractive index $N_3$ occurs in the second and sixth ring belts 202 and 206.

As shown in FIG. 4(c), the refractive index profile 401 occurring in the second to sixth ring belts 202 to 206 is such that the refractive index is low in the center portion and high in the both ends. Accordingly, the liquid crystal optical element 100 functions as a ring-shaped concave lens (gradient index refractive lens). Because of this refractive index profile 401, a light beam passing through the aperture control region 12 formed between the effective diameter 10 and the effective diameter 11 undergoes an effect similar to that provided by a concave lens, and is caused to diverge outside the optical path. Further, as the refractive index $N_1$ (for example, 0) occurs in the first ring belts 201, the liquid crystal optical element 10 does not exert any effect on the light passing through the portion within the effective diameter 10.

In this way, when the voltage such as shown in FIG. 4(b) is applied to the transparent electrode pattern 200 shown in FIG. 2, a refractive index profile 401 such as shown in FIG. 4(c) is developed, exerting an effect that causes the light passing through the aperture control region 12 to diverge. Here, if uniform voltage $V_3$ is applied to all the ring belts 202 to 206 formed in the aperture control region 12, the refractive index profile 401 is not generated, and the liquid crystal optical element 100 does not exert any effect on the light passing through the aperture control region.

FIG. 5 is a diagram schematically showing one configuration example of the optical device that uses the liquid crystal optical element 100 according to the present invention.

As shown in FIG. 5, the optical device 50 comprises a first light source 21, a first collimator lens 22, a second light source 26, a second collimator lens 27, a half-silvered mirror 23, a polarization beam splitter 24, the liquid crystal optical element 100 having the aperture control region 12, a drive control circuit 130 for the liquid crystal optical element 100, a λ/4 wave plate 30, an objective lens 25, a condenser lens 28, and a light detector 29.

FIG. 5(a) shows the case where the first light source 21 is turned on to read or to write a first recording medium 140 such as a DVD. In this case, the drive control circuit 130 applies the same voltage as that applied to the first ring belt 201 to the second to sixth ring belts 202 to 206 of the electrode pattern 200 formed in the aperture control region 12, thereby performing control so as not to generate the refractive index profile 401 such as shown in FIG. 4(c). As a result, the liquid crystal optical element 100 does not exert any effect on the light passing through the portion within the effective diameter 10 (φ=3 mm).

Next, a description will be given of the example case where the optical device 50 reads the first recording medium 140. A first light beam (650 nm) emitted from the first light source 21 is converted by the first collimator lens 22 into a substantially parallel light beam, which then passes through the half-silvered mirror 23, the polarization beam splitter 24, and the liquid crystal optical element 100 and enters the λ/4 wave plate 30. The light beam with the effective diameter 10, passed through the λ/4 wave plate 30, is focused by the objective lens 25 (in this case, numerical aperture NA=0.65) onto a track on the surface of the first recording medium 140.

The light beam reflected from the first recording medium 140 is again passed through the objective lens 25, the λ/4 wave plate 30, and the liquid crystal optical element 100, and is redirected by the polarization beam splitter 24 toward the condenser lens 28 through which the light is focused onto the light detector 29. The light beam, when reflected by the first recording medium 140, is amplitude-modulated by the information (pits) recorded in the track on the surface of the first recording medium 140, and the light detector 29 outputs the detected light beam by converting it into a light intensity signal corresponding to the amplitude modulation. The information recorded on the first recording medium can be read out from the light intensity signal (RF signal).

FIG. 5(b) shows the case where the second light source 26 is turned on to read or to write a second recording medium 141 such as a CD. In this case, the drive control circuit 130 applies a voltage such as that shown in FIG. 4(b) to the second to sixth ring belts 202 to 206 of the electrode pattern 200 formed in the aperture control region 12, thereby performing control so as to generate the refractive index profile 401 such as shown in FIG. 4(c). As a result, the liquid crystal optical element 100 functions as a ring-shaped concave lens for the light passing through the aperture control region 12, so that the light passing through the aperture control region 12 is caused to diverge, and is thus prevented from being directed to the objective lens 25 for focusing onto the track surface of the second recording medium 141. Here, the liquid crystal optical element 100 does not exert any effect on the light passing through the portion within the effective diameter 11 ($\phi$=2.35 mm).

Next, a description will be given of the example case where optical device 50 reads to the second recording medium 141. A second light beam (780 nm) emitted from the second light source 26 is converted by the second collimator lens 27 into a substantially parallel light beam; the light beam thus converted is then deflected by the half-silvered mirror 23, is passed through the polarization beam splitter 23 and the liquid crystal optical element 100, and enters the $\lambda$/4 wave plate 30. As described above, the light passing through the aperture control region 12 of the liquid crystal optical element 100 is caused to diverge, thus in effect preventing the light from being directed to the objective lens 25 for focusing; as a result, the light beam with the effective diameter 11, passed through the $\lambda$/4 wave plate 30, is focused by the objective lens 25 (in this case, numerical aperture NA=0.51) onto a track on the surface of the second recording medium 141.

The light beam reflected from the second recording medium 141 is again passed through the objective lens 25, the $\lambda$/4 wave plate 30, and the liquid crystal optical element 100, and is redirected by the polarization beam splitter 24 toward the condenser lens 28 through which the light is focused onto the light detector 29. The light beam, when reflected by the second recording medium 141, is amplitude-modulated by the information (pit) recorded in the track on the surface of the second recording medium 141, and the light detector 29 outputs the detected light beam by converting it into a light intensity signal corresponding to the amplitude modulation. The information recorded on the second recording medium can be read out from the light intensity signal (RF signal).

By controlling the voltage applied to the ring belts 202 to 206 of the transparent electrode pattern on the liquid crystal optical element 100, as described above, the aperture control region 12 can be selectively operated to allow or not allow the light passing therethrough to be directed to the objective lens 25 for focusing. The optical device can thus be constructed so that both DVD and CD can be read using the same objective lens. In FIG. 5, the DVD and CD combination has been taken as an example, but this is only one example, and the invention can also be applied to other combinations of recording media requiring different numerical apertures. In that case, the aperture control region 12 should be optimized for the combination of recording media used. For example, in the case of BD (Blu-ray Disc) and DVD, the numerical aperture (NA) is 0.85 for BD and 0.65 for DVD. Therefore, in the case of an objective lens for BD, the aperture control region 12 should be designed so as to provide an aperture ratio (effective diameter ratio) of 0.85:0.65. If the aperture of the incident light is limited by diverging the light entering the aperture control region 12 with the above aperture ratio, the objective lens for BD can be converted to an objective lens having the numerical aperture for DVD. Here, the numerical aperture is expressed as the ratio of pupil radius (effective diameter) d to focal length f (d/f); in the above case, as the objective lens 25 is fixed, and the focal length f therefore remains unchanged, the numerical aperture is changed by varying the pupil radius. While the above liquid crystal optical element 100 has been described as having only one kind of aperture control region 12, it is possible to provide more than one kind of aperture control region. In that case, three or more different kinds of recording media can be read using a single objective lens.

In the liquid crystal optical element 100 according to the present embodiment, the transparent electrode pattern 200 has been formed in the aperture control region 12 so as to provide the function of a ring-shaped concave lens. However, the transparent electrode pattern 200 need not necessarily be formed to provide the function of a ring-shaped concave lens, the only requirement being that the light beam passing through the aperture control region 12 be caused to diverge so as not to be directed to the objective lens 25. For example, the transparent electrode pattern 200 may be formed so that the aperture control region 12 of the liquid crystal optical element 100 serves a function equivalent to that of a ring-shaped convex lens. Alternatively, a transparent electrode pattern 200 having a plurality of unequally or randomly spaced ring belts of the same or different widths may be formed in the aperture control region 12 of the liquid crystal optical element 100. When a suitable voltage is applied to the transparent electrode pattern 200 having a plurality of unequally or randomly spaced ring belts of the same or different widths, the light beam passing through the aperture control region 12 is caused to diverge thus, in effect, preventing the light from being directed to the objective lens for focusing. Here, the wording "unequally spaced" means that the ring belts are arranged at unequal pitches. For example, a transparent pattern having a plurality of equally spaced ring belts of the same width is not formed in the aperture control region 12 of the liquid crystal optical element 100.

What is important in the aperture control region 12 of the present embodiment is that the incident light passing through the aperture control region 12 be made to diverge so as not to be directed to the objective lens 25 for focusing. Accordingly, there is no need for the refractive index profile 401 shown in FIG. 4(c) be always formed precisely as shown. The relationship between the applied voltage and the refractive index shown in FIG. 3 varies with ambient temperature but, if the refractive index profile 401 varies as a result of that, the incident light passing through the aperture control region 12 can still be made to diverge. That is, the liquid crystal optical element 100 can perform the aperture control regardless of variations in ambient temperature. In the prior art, the aperture of the light beam entering the aperture control region has been limited by utilizing wave optics phenomena relating sensitively to the wavelength of the light beam; that is, the aperture has been limited by utilizing diffraction and interference ($\lambda$/2 modulation) in the case of the objective lens described in Patent Document 1 and the liquid crystal optical element described in Patent Document 4, and by utilizing the rotation of the polarization axis ($\lambda$/2, $\lambda$/4 modulation) in the case of the liquid crystal optical element described in Patent Document 2 or 3. As a result, because of variations in the wavelength of the light beam used and variations in phase due to the temperature characteristics of the control medium (liquid crystal), slight variations in temperature or wavelength greatly affect the aperture limiting control, resulting in an inability to perform correct aperture limiting control. In contrast, in the case of the liquid crystal optical element according to the present embodiment, the aperture of the light beam entering the aperture control region 12 is limited by utilizing geometrical optics phenomena such as refraction. Accordingly, susceptibility to the wavelength variations and phase variations described above is reduced, and stable aperture limiting control can always be accomplished.

Further, in the present embodiment, the liquid crystal optical element 100 has been constructed to perform the aperture control for the first light source (650 nm) and the second light source (780 nm). The relationship between the applied voltage and the refractive index shown in FIG. 3 varies with the wavelength of the incident light but, if the refractive index profile 401 varies as a result of that, the incident light passing through the aperture control region 12 can still be made to diverge. That is, the liquid crystal optical element 100 can perform the aperture control regardless of the wavelength of the light beam used. Accordingly, not only two kinds of light beams, but three or more different kinds of light beams can also be used.

Next, a description will be given of the case where aperture control and spherical aberration correction are performed using a single transparent electrode pattern.

Figure 6B:
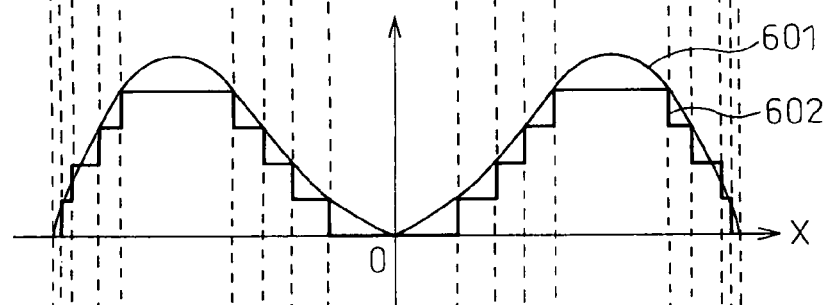
Figure 6C:
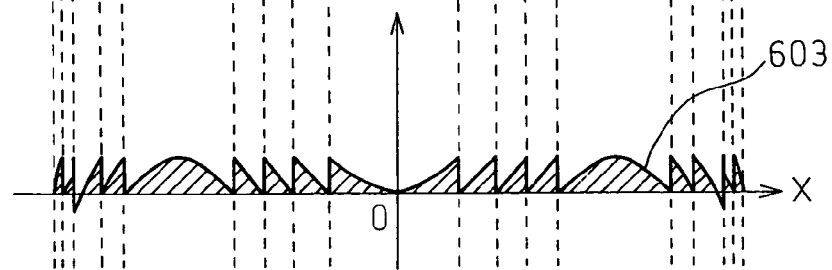

FIG. 6(a) shows another transparent electrode pattern 300 that can be used as the transparent electrode 107 of the liquid crystal optical element 100, FIG. 6(b) shows an example of a voltage applied to the transparent electrode pattern 300, and FIG. 6(c) shows an example of a corrected aberration.

As shown in FIG. 6(a), the transparent electrode pattern 300 includes, in addition to the second to sixth ring belts 202 to 206 formed in the aperture control region 12 shown in FIG. 2, spherical aberration correcting concentric ring belts 301 to 305 formed for spherical aberration correction. These ring belts are formed spaced apart from one another by a small distance for insulation, as in the transparent electrode pattern 200 shown in FIG. 2.

The curve 601 shown in FIG. 6(b) represents one example of spherical aberration (third order), as measured at the position of the entrance pupil, that occurs when the distance from the objective lens 25 to the track surface of the recording medium 140 is not constant because of such imperfections as unevenness in the thickness of the optically transmissive protective layer formed on the track surface. When a voltage such as shown by 602 in FIG. 6(b) is applied to the ring belts 202 to 206 and 301 to 305 to correct for such spherical aberration 601, a potential difference occurs with respect to the transparent counter electrode 108, and the orientation of the liquid crystal in the corresponding portion changes according to the potential difference. The light beam passing through that portion undergoes an effect that causes the phase to be delayed in accordance with the potential difference. As a result, the spherical aberration 601 is reduced by the phase delay proportional to the potential difference, as shown in FIG. 6(c) as a residual aberration 603 remaining after the aberration correction.

In this way, with the transparent electrode pattern 300, not only can the aperture of the light beam be controlled using the aperture control region 12 of the transparent electrode pattern 300, but the spherical aberration can also be corrected using the aperture control region 12 and the inner region formed inwardly thereof.

In the example of FIG. 6(b), control has been performed so that the same potential difference occurs, for example, at the ring belts 202 and 203. By thus controlling the potential difference, the spherical aberration 601 can be reduced, as far as possible, by using the second to sixth ring belts 202 to 206 formed in the aperture control region 12 of the transparent electrode pattern 300 shown in FIG. 6(a). However, the potential differences to be caused at the second to sixth ring belts 202 to 206 formed in the aperture control region 12 can be adjusted so as to better suppress the pattern of the spherical aberration occurring there.

When using the liquid crystal optical element 100 having the transparent electrode pattern 300 shown in FIG. 6(a), it is preferable that the liquid crystal optical element 100 be used to correct for the spherical aberration occurring on the first recording medium 140, such as DVD, by turning on the first light source 21 and controlling the potential difference as shown in FIG. 6(b) (see FIG. 5(a)). In this case, as the refractive index profile 401 shown in FIG. 4(c) does not occur in the aperture control region 12 having the ring belts 202 to 206, the objective lens 25 can use the light beam passed through the region within the effective diameter 10. Further, when using the liquid crystal optical element 100 having the transparent electrode pattern 300 shown in FIG. 6(a), it is preferable that the second recording medium 141, such as a CD, be used by turning on the second light source 26 and causing the refractive index profile 401 such shown in FIG. 4(c) to generate in the aperture control region 12 having the ring belts 202 to 206 while causing a uniform potential difference (for example, the same one as that occurring at the ring 301 in FIG. 6(b)) to occur over the entire region of the ring belts 301 to 305 (see FIG. 5(b)). In this case, the objective lens 25 uses the light beam passed through the region within the effective diameter 11, and correction for spherical aberration is not performed; however, even when using the second recording medium 141 such as a CD, correction for spherical aberration may be made if needed.

Next, a description will be given of another control method that uses the transparent electrode pattern 300 shown in FIG. 6(a).

Figure 7A:
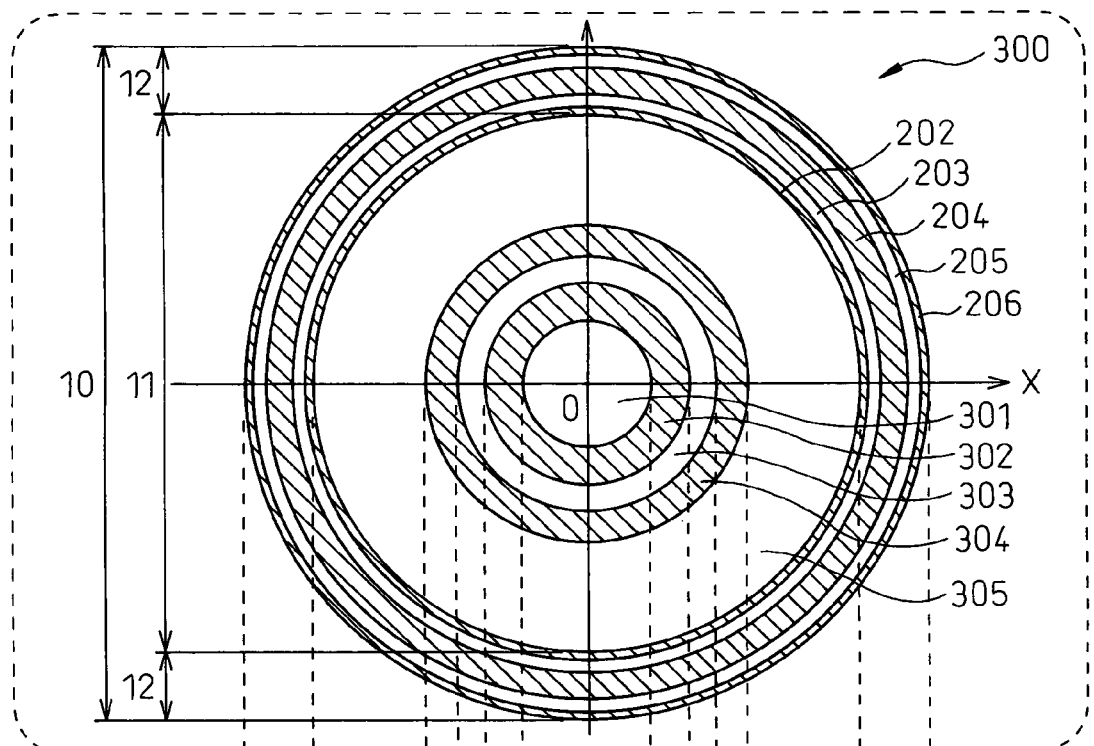
FIG. 7($a$) is a diagram showing one example of the transparent electrode pattern used for aperture control and spherical aberration correction, FIG. 7($b$) is a diagram showing another example of the voltage profile applied to the transparent electrode pattern shown in FIG. 7($a$), and FIG. 7($c$) is a diagram showing one example of a residual aberration resulting from FIG. 7($b$).
Figure 7B:
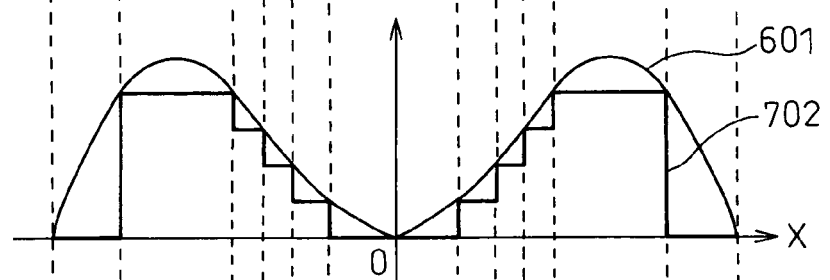
Figure 7C:
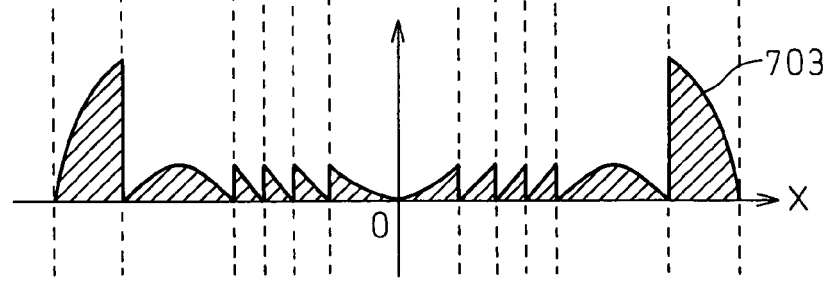

FIG. 7(a) shows the transparent electrode pattern 300, the same one as that shown in FIG. 6(a), FIG. 7(b) shows another example of the voltage applied to the transparent electrode pattern 300, and FIG. 7(c) shows an example of a corrected aberration. In the example shown in FIG. 7, the ring belts 202 to 206 formed in the aperture control region 12 are not used when correcting for spherical aberration.

The curve 601 shown in FIG. 7(b), like that shown in FIG. 6(b), represents one example of spherical aberration, as measured at the position of the entrance pupil, that occurs when the distance from the objective lens 25 to the track surface of the recording medium 140 is not constant because of such imperfections as unevenness in the thickness of the optically transmissive protective layer formed on the track surface. When a voltage such as shown by 702 in FIG. 7(b) is applied to the ring belts 301 to 305 to correct for such spherical aberration 601, a potential difference occurs with respect to the transparent counter electrode 108, and the orientation of the liquid crystal in the corresponding portion changes according to the potential difference. The light beam passing through that portion undergoes an effect that causes the phase to delay in accordance with the potential difference. As a result, the spherical aberration 601 is reduced by the phase delay proportional to the potential difference, as shown in FIG. 7(c) as a residual aberration 703 remaining after the aberration correction. As can be seen from a comparison between the residual aberration 703 shown in FIG. 7(c) and the residual aberration 603 shown in FIG. 6(c), the residual aberration 703 is larger because the ring belts 202 to 206 in the aperture control region 12 are not used for the aberration correction.

When using the transparent electrode pattern 300 as shown in FIG. 7, it is preferable that the liquid crystal optical element 100 having the transparent electrode pattern 300 be used to correct for the spherical aberration occurring on the first recording medium 140, such as DVD, by turning on the first light source 21 and controlling the potential difference as shown in FIG. 7(b) (see FIG. 5(a)), and that the second recording medium 141, such as a CD, be used by turning on the second light source 26 and causing the refractive index profile 401 such shown in FIG. 4(c) to generate in the aperture control region 12 having the ring belts 202 to 206 while causing a uniform potential difference (for example, the same one as that occurring at the ring 301 in FIG. 6(b)) to occur over the entire region of the rings 301 to 305 (see FIG. 5(b)).

When using the liquid crystal optical element 100 to correct for the spherical aberration occurring on the first recording medium 140, such as a DVD, by turning on the first light source 21 and controlling the potential difference as shown in FIG. 7(b), the spherical aberration correcting electrode pattern in this case is not formed over the entire region within the effective diameter 10 of the objective lens 25, but is formed within the inner region (inward of the aperture control region 12). In this case, the residual aberration 703 is somewhat larger as earlier described, but it becomes possible to solve the problem that spherical aberration cannot be properly corrected when the center of the light beam diameter is displaced from the center of the objective lens because of tracking or mounting errors.

FIG. 8 is a diagram for explaining the action of the spherical aberration correcting ring pattern formed in the inner region.

Figure 8A:
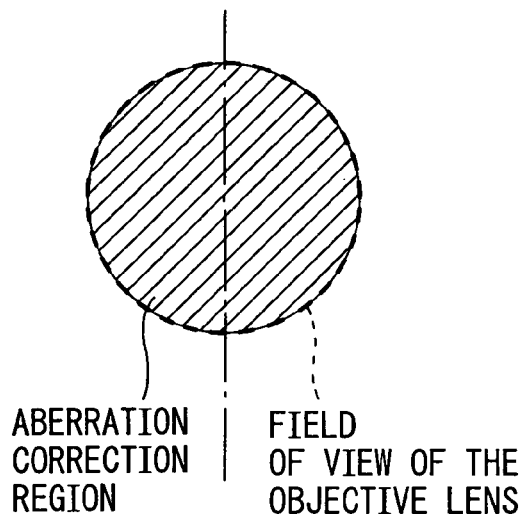
FIGS. 8($a$) and 8($b$) are diagrams showing the case where spherical aberration correction is performed over the entire region within the field of view of an objective lens, and FIGS. 8($c$) and 8($d$) are diagrams showing the case where the spherical aberration correction is performed within an inner region contained in the field of view of the objective lens.
Figure 8C:
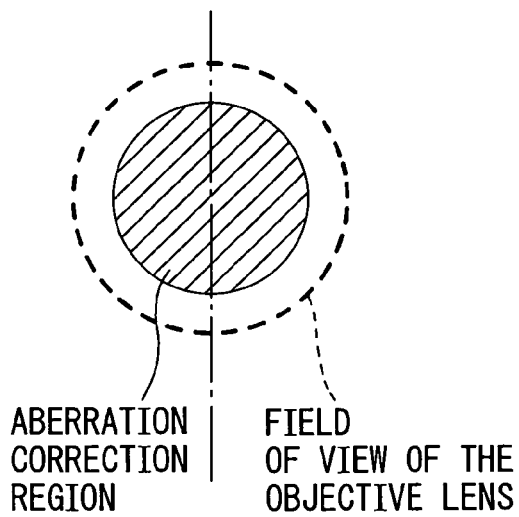
Figure 8B:
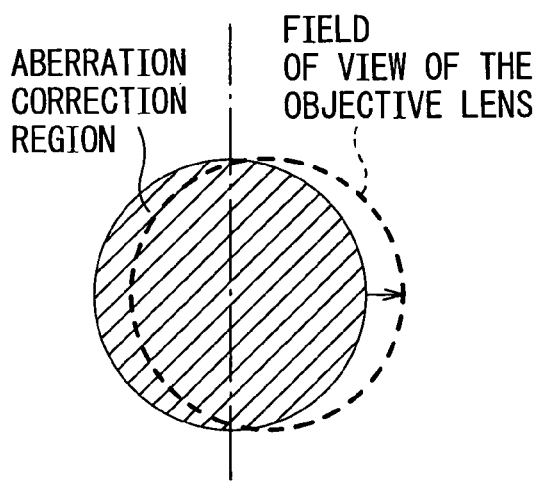

FIGS. 8(a) and 8(b) illustrate the case where the spherical aberration correction is performed over the entire region within the field of view of the objective lens (for example, within the effective diameter 10), that is, the field of view of the objective lens coincides with the aberration correcting region (this corresponds, for example, to the case shown in FIG. 6(b)).

When the field of view of the objective lens coincides with the aberration correcting region forming the spherical aberration correcting electrode pattern (FIG. 8(a)), the spherical aberration is optimally suppressed as shown in FIG. 6(c). However, if the field of view of the objective lens is displaced from the aberration correcting region (FIG. 8(b)) because of an error in the tracking movement of the objective lens 25 or a mounting error between the objective lens 25 and the liquid crystal optical element 100, the spherical aberration cannot be corrected effectively.

Figure 8D:
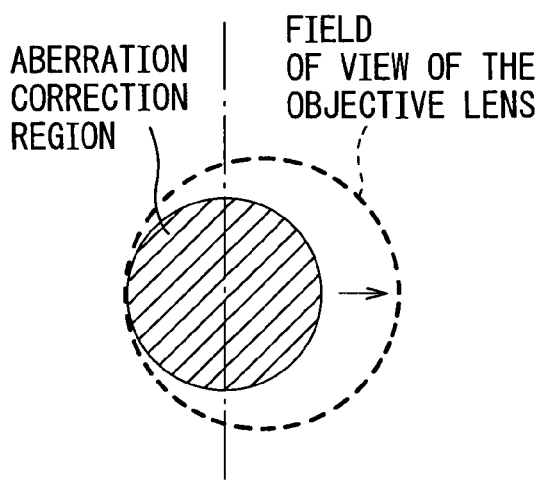

FIGS. 8(c) and 8(d) illustrate the case where the spherical aberration correction is performed within the inner region contained in the field of view of the objective lens (for example, in the effective diameter 10), that is, the aberration correcting region is smaller than the field of view of the objective lens (this corresponds, for example, to the case shown in FIG. 7(b)).

When the center of the field of view of the objective lens coincides with the center of the aberration correcting region forming the spherical aberration correcting electrode pattern (FIG. 8(c)), the spherical aberration is suppressed as shown in FIG. 7(c). Further, even when the center of the field of view of the objective lens is displaced from the center of the aberration correcting region (FIG. 8(d)) because of an error in the tracking movement of the objective lens 25 or a mounting error between the objective lens 25 and the liquid crystal optical element 100, the spherical aberration can be sufficiently corrected, though the degree of aberration correction somewhat drops. This is because the entirety of the spherical aberration correcting electrode pattern stays within the field of view of the objective lens.

Next, a description will be given of the case where aperture control and coma aberration (third order) correction are performed using a single transparent electrode pattern.

FIG. 9(a) shows another transparent electrode pattern 400 that can be used as the transparent electrode 107 of the liquid crystal optical element 100, FIG. 9(b) shows an example of a voltage applied to the transparent electrode pattern 400, and FIG. 9(c) shows an example of a corrected aberration.

As shown in FIG. 9(a), the transparent electrode pattern 400 includes right-side ring belts 212 to 216 and left-side ring belts 222 to 226 formed by splitting the second to sixth ring belts 202 to 206 in the aperture control region 12 shown in FIG. 2 between left and right along the centerline in the figure. The transparent electrode pattern 400 further includes regions 401 to 405 for coma aberration correction. These regions 401 to 405 are formed each spaced apart from one another by a small distance, for insulation, as in the transparent electrode pattern 200 shown in FIG. 2.

The curve 901 shown in FIG. 9(b) represents one example of coma aberration, as measured at the position of the entrance pupil, that occurs when the optical axis of the light beam focused by the objective lens 25 is tilted relative to the track surface of the recording medium 140. When a voltage such as shown by 902 in FIG. 9(b) is applied to the ring belts 212 to 216 and 222 to 226 and the regions 401 to 405 to correct for such coma aberration 901, a potential difference occurs with respect to the transparent counter electrode 108, and the orientation of the liquid crystal in the corresponding portion changes according to the potential difference. The light beam passing through that portion undergoes an effect that causes the phase to delay in accordance with the potential difference. As a result, the coma aberration 901 is reduced by the phase delay proportional to the potential difference, as shown in FIG. 9(c) as a residual aberration 903 remaining after the aberration correction.

In this way, with the transparent electrode pattern 400, not only can the aperture of the light beam be controlled using the aperture control region 12 of the transparent electrode pattern 400, but the coma aberration can also be corrected using the aperture control region 12 and the inner region formed inward thereof. In FIG. 9(b), voltages of opposite polarities about the reference potential are applied to the ring belts 212 to 216 and the ring belts 222 to 226, respectively, but when performing the aperture control, voltages of the same polarity are applied to all the ring belts, as shown in FIG. 4(b). Further, unlike the ring belts of the transparent electrode pattern 200 shown in FIG. 2, the ring belts formed in the aperture control region 12 of the transparent electrode pattern 400 shown in FIG. 9(a) are split between left and right along the centerline in the figure, but this does not substantially affect the aperture control as the gap between the left-side and right-side rings is extremely small.

In the example of FIG. 9(b), control has been performed so that the same potential difference occurs at the ring belts 212 to 216 and at the ring belts 222 and 226, respectively. By thus controlling the potential difference, the coma aberration 901 can be reduced, as far as possible, by using the ring belts 212 to 216 and 222 to 226 formed in the aperture control region 12 of the transparent electrode pattern 400 shown in FIG. 9(a). However, the ring belts 212 to 216 and 222 to 226 formed in the aperture control region 12 can be adjusted so as to better suppress the pattern of the coma aberration occurring there.

When using the liquid crystal optical element 100 having the transparent electrode pattern 400 shown in FIG. 9(a), it is preferable that the liquid crystal optical element 100 be used to correct for the coma aberration occurring on the first recording medium 140, such as a DVD, by turning on the first light source 21 and controlling the potential difference as shown in FIG. 9(b) (see FIG. 5(a)). In this case, as the refractive index profile 401 shown in FIG. 4(c) does not occur in the aperture control region 12 having the ring belts 212 to 216 and 222 to 226, the objective lens 25 can use the light beam passed through the region within the effective diameter 10. Further, when using the liquid crystal optical element 100 having the transparent electrode pattern 400 shown in FIG. 9(a), it is preferable that the second recording medium 141, such as a CD, be used by turning on the second light source 26 and causing the refractive index profile 401 such shown in FIG. 4(c) to generate in the aperture control region 12 having the ring belts 212 to 216 and 222 to 226 while causing a uniform potential difference (for example, the same one as that occurring at the region 405 in FIG. 9(b)) to occur over the entire regions 401 to 405 (see FIG. 5(b)). In this case, the objective lens 25 can use the light beam passed through the region within the effective diameter 11, but correction for coma aberration is not performed.

Next, a description will be given of another control method that uses the transparent electrode pattern 400 shown in FIG. 9(a).

FIG. 10(a) shows the transparent electrode pattern 400, the same one as that shown in FIG. 9(a), FIG. 10(b) shows another example of the voltage applied to the transparent electrode pattern 400, and FIG. 10(c) shows an example of a corrected aberration. In the example shown in FIG. 10, the ring belts 212 to 216 and 222 to 226 formed in the aperture control region 12 are not used when correcting for coma aberration.

The curve 1001 shown in FIG. 10(b), like that shown in FIG. 9(b), represents one example of coma aberration, as measured at the position of the entrance pupil, that occurs when the optical axis of the light beam focused by the objective lens 25 is tilted relative to the track surface of the recording medium 140. When a voltage such as that shown by 1002 in FIG. 10(b) is applied to the regions 401 to 405 to correct for such a coma aberration 1001, a potential difference occurs with respect to the transparent counter electrode 108, and the orientation of the liquid crystal in the corresponding portion changes according to the potential difference. The light beam passing through that portion undergoes an effect that causes the phase to delay in accordance with the potential difference. As a result, the coma aberration 1001 is reduced by the phase delay proportional to the potential difference, as shown in FIG. 10(c) as a residual aberration 1003 remaining after the aberration correction. As can be seen from a comparison between the residual aberration 1003 shown in FIG. 10(c) and the residual aberration 903 shown in FIG. 9(c), the residual aberration 1003 is larger because the ring belts 212 to 216 and 222 to 226 in the aperture control region 12 are not used for the aberration correction.

When using the transparent electrode pattern 400 as shown in FIG. 10, it is preferable that the liquid crystal optical element 100 having the transparent electrode pattern 400 be used to correct for the coma aberration occurring on the first recording medium 140, such as DVD, by turning on the first light source 21 and controlling the potential difference as shown in FIG. 10(b) (see FIG. 5(a)), and that the second recording medium 141, such as a CD, be used by turning on the second light source 26 and causing the refractive index profile 401 such shown in FIG. 4(c) to be generated in the aperture control region 12 having the ring belts 212 to 216 and 222 to 226 while causing a uniform potential difference (for example, the same one as that occurring at the region 405 in FIG. 10(b)) to occur over the entire regions 401 to 405 (see FIG. 5(b)).

When using the liquid crystal optical element 100 to correct for the coma aberration occurring on the first recording medium 140, such as a DVD, by turning on the first light source 21 and controlling the potential difference as shown in FIG. 10(b), the coma aberration correcting electrode pattern in this case is not formed over the entire region within the effective diameter 10 of the objective lens 25, but is formed within the inner region (inward of the aperture control region 12). In this case, the residual aberration 1003 is somewhat larger as earlier described, but it becomes possible to solve the problem that coma aberration cannot be properly corrected when the center of the light beam diameter is displaced from the center of the objective lens because of tracking or mounting errors. The principle for this is the same as that described for the spherical aberration correction with reference to FIG. 8.

What is claimed is:

1. An optical device comprising:
    a light source;
    a liquid crystal optical element which includes:
        a first substrate;
        a second substrate;
        a liquid crystal layer provided between said first and second substrates;
        an electrode pattern formed on one of said first and second substrates and having a first set of electrodes and a second set of electrodes disposed at an outer circumference of said first set of electrodes;
        a opposite electrode formed on the other one of said first and second substrates, said opposite electrode being opposed to said electrode pattern for applying a voltage therebetween,
    an objective lens for focusing light passed through said liquid crystal optical element; and
    a drive circuit configured to apply a plurality of voltage values to said first set of electrodes and said second set of electrodes such that a refractive index profile is formed within said liquid crystal layer, said refractive index profile causing incident light emitted from said light source and passing through said first set of electrodes to be directed to said objective lens for focusing at a focal point, and causing incident light passing through said second set of electrodes to diverge and to be prevented from being directed to said objective lens for focusing at said focal point, wherein:
        said second set of electrodes comprises at least three ring belt electrodes adjacent to each other;
        said drive circuit is configured to apply to a middle one of said three ring belt electrodes a first voltage value greater than second voltage values applied to the other two ring belt electrodes; and
        said drive circuit is configured to apply a third voltage value to one of said first set of electrodes immediately adjacent to said second set of electrodes so that said third voltage value is greater than said second voltage values.

2. An optical device as claimed in claim 1, wherein said second set of electrodes are formed from a plurality of ring belts arranged at unequally spaced intervals.

3. An optical device as claimed in claim 1, wherein said second set of electrodes are formed from a plurality of ring belts arranged at spaced intervals having no periodicity.

4. The optical device as claimed in claim 1, wherein said first set of electrodes comprises spherical aberration correcting electrodes formed inward of said second set of electrodes.

5. The optical device as claimed in claim 1, wherein said first set of electrodes comprises coma aberration correcting electrodes formed inward of said second set of electrodes.

6. The optical device as claimed in claim 1, wherein said second set of electrodes controls the numerical aperture of said objective lens.

7. The optical device as claimed in claim 1, wherein said third voltage value is equal to said first voltage value.

8. The optical device as claimed in claim 1, wherein:
    said second set of electrodes further comprises two additional ring belt electrodes located at periphery of said three ring belt electrodes: and said drive circuit is configured to apply to said two additional ring belt electrodes fourth voltage values smaller than said second voltage values.

9. The optical device as claimed in claim 8, wherein said third voltage value is greater than said fourth voltage values.

10. The optical device as claimed in claim 1, wherein said middle one of said three ring belt electrodes is coupled to said the other two ring belt electrodes via resistors.

11. The optical device and claimed in claim 8, wherein:
said middle one of said three ring belt electrodes is coupled to said the other two ring belt electrodes via first resistors; and
said two additional ring belt electrodes are coupled to said the other two ring belt electrodes respectively via second resistor.

* * * * *